(12) United States Patent
Khan K. A. et al.

(10) Patent No.: US 11,459,511 B2
(45) Date of Patent: Oct. 4, 2022

(54) CRUDE STABILIZER BYPASS

(71) Applicant: Saudi Arabian Oil Company, Dhahran (SA)

(72) Inventors: Ashiff Khan K. A., Dhahran (SA); Mustafa A. Jubran, Dhahran (SA); Ali T. Hajji, Al-Ahsa (SA); Abdulmohsen K. Wosaifer, Dhahran (SA); Abdulrahman M. AlShammari, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 350 days.

(21) Appl. No.: 16/844,716

(22) Filed: Apr. 9, 2020

(65) Prior Publication Data

US 2021/0317371 A1    Oct. 14, 2021

(51) Int. Cl.
*C10G 7/02* (2006.01)
*C10G 7/04* (2006.01)
*C10G 7/12* (2006.01)

(52) U.S. Cl.
CPC ............... *C10G 7/02* (2013.01); *C10G 7/04* (2013.01); *C10G 7/12* (2013.01); *C10G 2300/1033* (2013.01); *C10G 2300/207* (2013.01); *C10G 2300/208* (2013.01)

(58) Field of Classification Search
CPC ... C10G 7/02; C10G 7/04; C10G 7/12; C10G 2300/1033; C10G 2300/207; C10G 2300/208; C10G 31/06; C10G 32/02; C10G 33/02; C10G 33/08; B01D 17/0214; B01D 19/0036
See application file for complete search history.

(56) References Cited

U.S. PATENT DOCUMENTS

| | | | |
|---|---|---|---|
| 4,548,708 | A | 10/1985 | Schwarzer et al. |
| 5,030,339 | A | 7/1991 | Czarnecki |
| 6,364,940 | B1 | 4/2002 | Prueter et al. |
| 8,197,673 | B2 | 6/2012 | Khan |
| 8,298,505 | B2 | 10/2012 | Zhai et al. |

(Continued)

FOREIGN PATENT DOCUMENTS

| | | | |
|---|---|---|---|
| WO | WO 2018005443 | | 1/2018 |
| WO | WO 2018/129228 | * | 7/2018 |
| WO | WO 2018129228 | | 7/2018 |

OTHER PUBLICATIONS

PCT International Search Report and Written Opinion in International Appln. No. PCT/US2021/026642, dated Jul. 26, 2021, 14 pages.

(Continued)

*Primary Examiner* — Randy Boyer
*Assistant Examiner* — Juan C Valencia
(74) *Attorney, Agent, or Firm* — Fish & Richardson P.C.

(57) ABSTRACT

A system and method to remove gas, water, and salt from crude oil via a GOSP train and discharging the crude oil from a desalter vessel of the GOSP train as unstabilized crude oil to a stabilizer distillation column, removing gas from the unstabilized crude oil via the stabilizer distillation column to reduce vapor pressure of the unstabilized crude oil to give stabilized crude oil, and diverting a bypass portion of the unstabilized crude oil discharged from the desalter vessel to the stabilized crude oil downstream of the stabilizer distillation column.

22 Claims, 5 Drawing Sheets

(56) References Cited

U.S. PATENT DOCUMENTS

| | | | |
|---|---|---|---|
| 8,790,509 B2 | 7/2014 | Vu | |
| 8,805,587 B1 | 8/2014 | Elshafei et al. | |
| 9,092,124 B2 | 7/2015 | Amminudin et al. | |
| 9,295,957 B2 | 3/2016 | Choi et al. | |
| 9,493,712 B2 | 11/2016 | Barroeta et al. | |
| 9,555,345 B2 | 1/2017 | Al-Shafei et al. | |
| 9,861,910 B2 | 1/2018 | Hammad et al. | |
| 10,260,010 B2 | 4/2019 | Soliman | |
| 10,513,663 B2 | 12/2019 | Soliman | |
| 2017/0369791 A1 | 12/2017 | Khan et al. | |
| 2020/0080007 A1 | 3/2020 | Soliman et al. | |

OTHER PUBLICATIONS arab-oil-naturalgas.com [online], "Crude Oil Sweetening and Stabilization," retrieved from URL <https://www.arab-oil-naturalgas.com/crude-oil-sweetening/>, published Feb. 10, 2017, retrieved on Apr. 17, 2020, 13 pages.

archive.aramcoworld.com [online], "Sweetening Up the Crude," retrieved from URL <https://archive.aramcoworld.com/issue/196001/sweetening.up.the.crude.htm>, published as Aramco World, vol. 11, No. 1, issued Jan. 1960, retrieved on Apr. 17, 2020, 2 pages.

hydrocarbons-technology.com [online], "Saudi Aramco Abqaiq Plants Facility," retrieved from URL <https://www.hydrocarbons-technology.com/projects/abqaiq-aramco/>, available on or before Feb. 2010, retrieved on Apr. 17, 2020, 12 pages.

\* cited by examiner

400

CRUDE STABILIZER BYPASS

TECHNICAL FIELD

This disclosure relates to processing crude oil from a wellhead.

BACKGROUND

A gas oil separation plant (GOSP) may be a system employed at a wellhead to process crude oil received from the wellhead. The crude oil received at the GOSP from the wellhead may be as obtained from a hydrocarbon-bearing reservoir in a subterranean formation. The GOSP may have a train of vessels that operate at sequentially lower pressure to remove volatile gases, water, and salt from the crude oil. The GOSP typically also has a stabilizer column either integrated or as separate facility. The GOSP may discharge the processed crude oil for distribution including to storage and export, and for further processing such as in a petroleum refinery.

SUMMARY

An aspect relates to a method of operating a GOSP including receiving crude oil from a wellhead and removing gas, water, and salt from the crude oil via a GOSP train including a first production trap, a second production trap, a dehydrator vessel, and a desalter vessel. The method includes discharging the crude oil from the desalter vessel as unstabilized crude oil to a stabilizer distillation column, removing gas from the unstabilized crude oil via the stabilizer distillation column to reduce vapor pressure of the unstabilized crude oil, and discharging stabilized crude oil from the stabilizer distillation column. The method includes diverting a bypass portion of the unstabilized crude oil discharged from the desalter vessel to the stabilized crude oil downstream of the stabilizer distillation column to give a product crude oil, wherein the product crude oil includes the stabilized crude oil discharged from the distillation column and the bypass portion of the unstabilized crude oil.

Another aspect is a method of operating a GOSP including removing gas, water, and salt from feed crude oil received from a wellhead to give an intermediate crude oil comprising de-gassed, dehydrated, and desalted crude oil. The method includes discharging the intermediate crude oil from a desalter vessel to a stabilizer distillation column, removing gas from the intermediate crude oil via the stabilizer distillation column to reduce vapor pressure of the intermediate crude oil to give stabilized crude oil, and discharging the stabilized crude oil from the stabilizer distillation column. The method includes bypassing a portion of the intermediate crude oil from the desalter vessel around the stabilizer distillation column to the stabilized crude oil operationally downstream of the stabilizer distillation column to give a product crude oil. The product crude oil includes the stabilized crude oil discharged from the stabilizer distillation column plus the portion of the intermediate crude oil from the desalter vessel that bypasses the distillation column.

Yet another aspect is GOSP including a first production trap to receive crude oil from a wellhead and remove gas and water from the crude oil. The GOSP includes a second production trap to receive the crude oil from the first production trap and remove gas from the crude oil. The GOSP includes a dehydrator vessel to receive the crude oil from the second production trap and remove water from the crude oil. The GOSP includes a desalter vessel to receive the crude oil from the dehydrator vessel and remove salt from the crude oil via water discharged from the desalter vessel. The GOSP includes a stabilizer distillation column to receive the crude oil from the desalter vessel and remove gas from the crude oil to reduce vapor pressure of the crude oil. The GOSP includes a bypass conduit to route a bypass portion of the crude oil from the desalter vessel to a conduit conveying crude oil discharged from the stabilization distillation column.

The details of one or more implementations are set forth in the accompanying drawings and the description below. Other features and advantages will be apparent from the description and drawings, and from the claims.

BRIEF DESCRIPTION OF DRAWINGS

Like reference numbers and designations in the various drawings indicate like elements.

DETAILED DESCRIPTION

The stabilizer (a distillation column) in or associated with a gas oil separation plant (GOSP) removes lighter components from crude oil to give a desired vapor pressure (e.g., Reid vapor pressure or RVP) so that the crude oil is stabilized crude oil. The distillation column may remove hydrogen sulfide (H2S) from the crude oil to sweeten the crude oil.

Some aspects of the present disclosure are directed to routing a slip stream of unstabilized crude oil from a desalter to bypass the stabilizer. This slip stream of unstabilized crude oil that bypasses the stabilizer may be incorporated in stabilized crude oil discharged from the stabilizer to increase the production of product crude oil by the GOSP. The bypass may increase the throughput or capacity of the GOSP. The slip stream of unstabilized crude oil from the desalter that bypasses the stabilizer may be added, for example, to a conduit on the discharge of the bottoms pump of the stabilizer distillation column.

Figure 1:
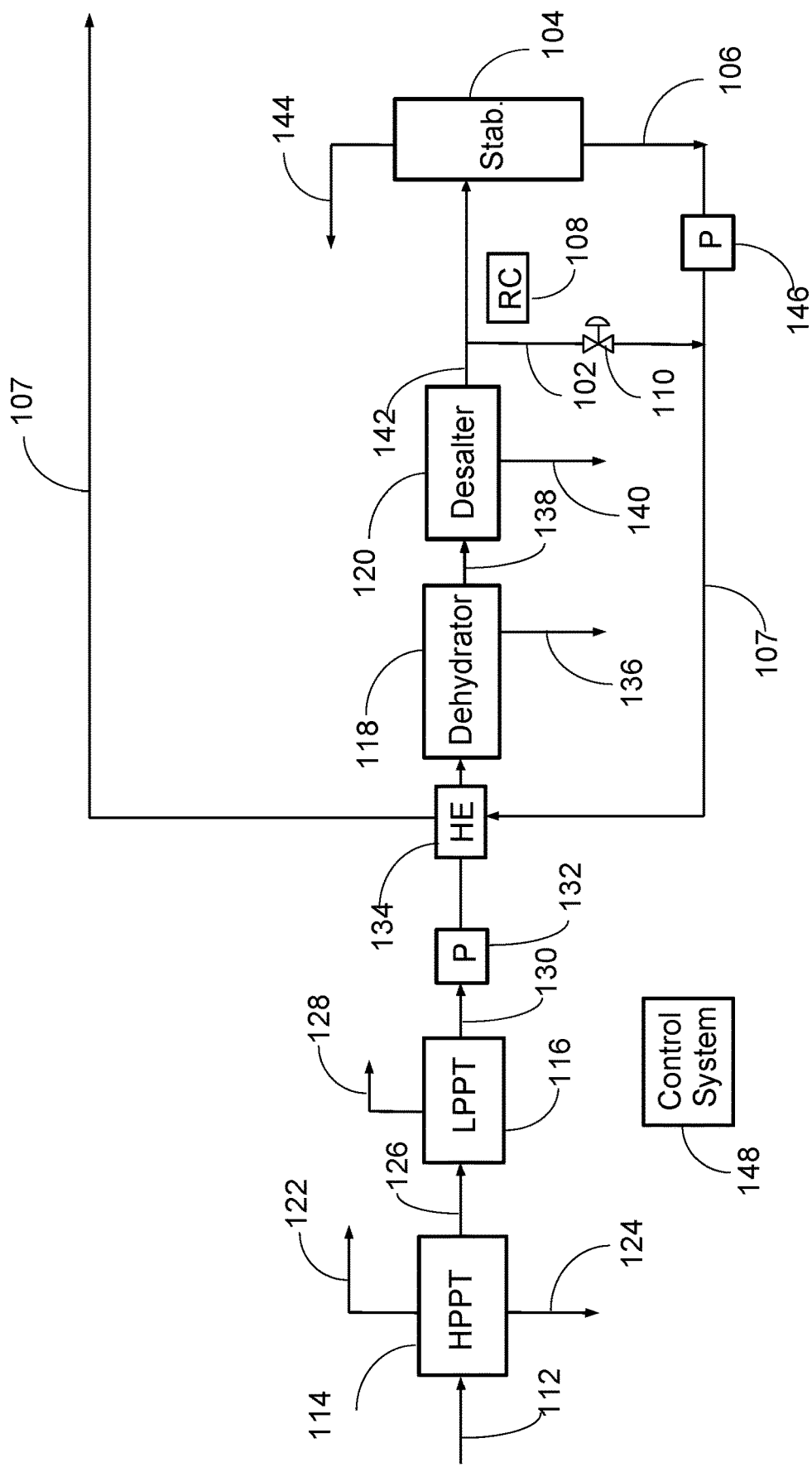
FIGS. 1-4 are each a flow diagram of a gas oil separation plant (GOSP).

FIG. 1 is a GOSP 100 that processes crude oil. The GOSP 100 removes gas and water from the crude oil. The GOSP 100 may remove hydrocarbons as gas from the crude oil via lowering pressure of the crude oil, as discussed below. The removed hydrocarbons may be light hydrocarbons (e.g., C1 to C4) and medium or heavier hydrocarbons (e.g., C5+). The GOSP 100 may remove salt from the crude oil.

The GOSP 100 includes a bypass 102 around the stabilizer 104. The stabilizer 104 (e.g., distillation column) may remove light components from the crude oil to give a stabilized crude oil. The stabilizer 104 may remove H2S from the crude oil to give sweeten stabilized crude oil. The bypass 102 may be a slip stream of unstabilized crude oil routed through a bypass 102 conduit to the discharge 106 of the stabilizer 104. The bypass 102 may facilitate an increase in throughput of the GOSP 100 and thus give an increase in production of product crude oil 107. The product crude oil 107 may be the stabilized crude oil 106 discharged from the stabilizer 104 plus the bypass 102 flow of unstabilized crude oil. In operation, the amount of the bypass 102 flow (unstabilized crude) may be specified (e.g., limited to 20% or less of the product crude oil 107) such that the bypass 102 flow does not cause the product crude oil 107 to fail to meet specifications. In some examples, the ratio of the unstabilized crude oil from the bypass 102 to the stabilized crude oil 106 discharged from the stabilizer 104 may be specified. In certain implementations, a maximum of this ratio may be specified as 25% or 20%. In implementations, a ratio controller (RC) 108 may specify the set point on the bypass 102 control valve 110, as discussed below. In other implementations, the set point on the bypass 102 control valve 110 may be manually set. The RC 108 may be a ratio indicator controller (RIC) 108 in that the ratio may be indicated locally and/or remotely.

In some examples, GOSPs without stabilizers 104 may be located in scattered locations and feed sent to a centralized stabilization unit as a stabilizer 104 distant from the respective GOSPs. In such cases, one or more of the GOSPs may bypass the centralized stabilization unit with an RIC 108 to meet the export crude specifications.

The GOSP 100 receives feed crude oil 112 from a wellhead of a well. The feed crude oil 112 may be as produced from a subterranean formation through a wellbore and the wellhead (and production manifold) to the GOSP 100. The feed crude oil 112 may flow through a production manifold associated with one or more wellheads to the GOSP 100. The feed crude oil 112 may be from a well pool. The feed crude oil 112 may include water and thus be labeled as wet crude oil. The feed crude oil 112 received at the GOSP 100 may be a tight emulsion of oil and water in some examples. A tight emulsion is generally an emulsion with small and closely distributed droplets.

In the illustrated example, the GOSP 100 includes a high-pressure production trap (HPPT) 114, a low-pressure production trap (LPPT) 116, a dehydrator 118, and a desalter 120. The HPPT 114, LPPT 116, dehydrator 118, and desalter 120 are each a separator vessel that may have a horizontal orientation or vertical orientation. In embodiments, the HPPT 114, LPPT 116, dehydrator 118, and desalter 120 are all horizontal vessels. In certain examples, the HPPT 114 vessel, LPPT 116 vessel, dehydrator 118 vessel, and desalter 120 vessel each have elliptical-type heads.

The HPPT 114 vessel, LPPT 116 vessel, dehydrator 118 vessel, and desalter 120 vessel generally include nozzles (e.g., flanged, screwed connections, etc.) on the vessel body or heads to couple to conduits for receiving and discharging streams. An inlet on the vessel may be a nozzle that couples to a feed or supply conduit to the vessel. An outlet on the vessel may be a nozzle that couples to a discharge conduit from the vessel. Nozzles on the vessels may also be employed for instrumentation (e.g., sensors, gauges, transmitters, etc.) and other uses.

In operation, the HPPT 114 may receive the feed crude oil 112 via a conduit. The HPPT 114 as a separation vessel may provide for a three-phase separation. In particular, the HPPT 114 separates gas 122 and water 124 from the feed crude oil 112 and discharges crude oil 126.

The HPPT 114 vessel may include an inlet separation device to promote separation of the gas 122 and water 124 from the feed crude oil 112. The inlet separation device may promote an initial gross separation by changing the flow direction of the feed crude oil 112 entering the HPPT 114 vessel. The inlet separation device may be, for example, an inlet diverter. The inlet diverter can be a splash plate, inlet deflector, deflector baffle, or baffle plate(s). The inlet diverter as a baffle plate can be a spherical dish, flat plate, angle iron, or another type of structural steel. The inlet diverted can be a half sphere, cone, or centrifugal diverter, and so on.

The HPPT 114 as a three-phase separator vessel may utilize gravity or density difference to separate the water 124 from the crude oil 112. For instance, the HPPT 114 vessel may include a weir to facilitate the separation in which the oil (the lighter of the two liquids) overflows the weir. The water 124 may generally discharge from within the weir. The separated water 122 may be an oily water and sent, for example, to a water/oil separator.

The operating pressure in the HPPT 114 may be at least 50 pounds per square inch gauge (psig) or at least 150 psig. The operating temperature in the HPPT 114 may be, for example, at least about 65° F., or in a range of 65° F. to 130° F.

The separated gas 122 that discharges from the HPPT 114 may generally be light hydrocarbons. The feed crude oil 112 is reduced in pressure in the HPPT 114 to separate the gas 122. In embodiments, the gas 122 may be light hydrocarbons (C1-C4) having a number of carbons in the range 1 to 4 and trace amount of C5 hydrocarbons having five carbons. In examples, the gas 122 as a light (or lighter) hydrocarbon stream may generally be C1-C4 components (e.g., methane, ethane, propane, butane, iso-butane) and trace amounts of C5+ compounds. The pressure of the gas 122 as discharged may range in pressure from 50 psig (or 150 psig) to 450 psig depending, for example, on the supply pressure of the feed crude oil 112. The gas 122 can include lighter hydrocarbons, traces of C5+ hydrocarbons, H2S, carbon dioxide (CO2), nitrogen (N2), and water vapor. The relative amounts and types of compounds in the gas 122 may typically depend on composition of the feed crude oil 112 and the flash pressure in HPPT. The separated gas 122 may be sent to a mechanical compressor or to a gas plant for recovery.

The crude oil 126 is discharged from the HPPT 114 via a conduit to the LPPT 116. The motive force for flow of the crude oil 126 may pressure differential. The LPPT 116 operates at a lower pressure than the HPPT 114. The operating pressure in the LPPT 116 may be less than 100 psig or less than 50 psig. The operating temperature of the LPPT 116 may be, for example, at least about 65° F., or in a range of 65° F. to 130° F. The LPPT 116 vessel may include an inlet diverter to promote an initial gross separation of gas 128 from the crude oil 126 by changing the flow direction of the entering crude oil 126.

The LPPT 116 may be characterized as a two-phase separation vessel or three-phase separation vessel. The LPPT 116 separates gas 128 (e.g., certain remaining off-gases) from the crude oil 126 and discharges a crude oil 130 stream. The gas 128 may typically be heavier hydrocarbons. The medium or heavy hydrocarbon stream as the gas 128 may refer generally to C5+ (five-carbon and greater) hydrocarbons (e.g., pentane, iso-pentane, hexane, and heptane) and trace amounts of lighter hydrocarbons and other light components. In certain examples, the gas 128 may discharge at a pressure of less than 30 psig, or at least 30 psig, or in a range of 40 psig to 90 psig. The gas 128 may be sent to a mechanical compressor or gas compression plant for recovery.

The crude oil 130 discharged from the LPPT 116 may be labeled as de-gassed and de-watered crude oil. The crude oil 130 may be pumped (via pump 132) from the LPPT 116 through a heat exchanger 134 to the dehydrator 118. The pump 132 may be, for example, a centrifugal pump or positive displacement pump. The heat exchanger 134 may be, for example, a shell-and-tube heat exchanger, a plate-and-frame heat exchanger, etc. In operation, the pump 132 head provides motive force for flow of the crude oil 130 through the heat exchanger 134 to the dehydrator 118. In some embodiments, a degassing tank vessel (not shown) may be operationally disposed between the heat exchanger 134 and the dehydrator 118.

The heat exchanger 134 heats the crude oil 130 to advance downstream separation of water and salt from the crude oil. This increase in temperature of the crude oil 130 may promote coalescence and settling of water droplets from the crude oil in downstream processing. The heat transfer fluid for the heat exchanger 134 may be, for example, steam or steam condensate, or a process stream (e.g., crude oil as depicted). In the illustrated embodiment, the crude oil 130 is heated in the heat exchanger 134 via cross-exchange with other crude oil to recover heat from the other crude oil.

In the dehydrator 118 vessel, water 136 is separated from the crude oil 130. Salt may discharge in the water 136 and thus be removed from the crude oil 130. Electrostatic coalescence may be employed in the dehydrator 118. In implementations, an electrostatic field is generated between electrodes in the dehydrator 118 vessel. Electrostatic coalescence applies an electric current, causing water droplets in the crude oil (emulsion) to collide, coalesce into larger (heavier) drops, and settle out of the crude oil as separate liquid water. This process partially dries wet crude oil. In one example, operating conditions of a dehydrator 118 unit include temperature in a range of 130° F. to 160° F., and a pressure at about 25 psig above the crude oil 130 vapor pressure. In some examples, fresh or recycle wash water (e.g., relatively low in salt) and/or chemicals may be injected into the dehydrator vessel 118 to advance separation of the water 136 from the crude oil 130. The separated water 136 discharged from the dehydrator 118 may be oily water (e.g., having salt) and sent to an oil/water separator vessel. The dehydrator 118 vessel may discharge crude oil 138 via a conduit to the desalter 120 vessel. The crude oil 138 may be labeled as dehydrated crude oil with some salt removed in implementations.

The salt removal in the GOSP 100 can be multi-stage. Both the desalter 120 and the dehydrator 118 may provide for salt removal. Moreover, in some examples, the desalter 120 can be two or more desalter vessels in series.

In the illustrated embodiment, a single desalter 120 vessel is depicted. Water 140 having salt discharges from the desalter 120. Water (e.g., fresh water) may be added to the desalter 120 vessel to facilitate removal of salt from the crude oil 138. The water added may be low in salt concentration relative to the salt concentration of water (e.g., emulsified water) in the crude oil 138. Fresh wash water (as opposed, for example, to recycle water having more salt) may be utilized in the desalting process to increase the amount of salt rinsed from the crude oil 138. Wash water salinity can range from between about 100 parts per million (ppm) to about 12,000 ppm. Again, wash water is more effective if the salinity level is low. Formation water salinity produced with crude oil can reach as high as about 270,000 ppm of salt or more.

As in the upstream dehydrator 118, electrostatic coalescence may be employed in the desalter 120 vessel. Electrostatic coalescence may remove water emulsion from the crude oil 138. Operating conditions in the desalter 120 may be, for example, include a temperature in a range of 130° F. to 160° F. and an operating pressure at least 25 psig above vapor pressure of the crude oil 138. The crude oil 142 that discharges from the desalter 120 may be labeled as an intermediate crude that is dry (dehydrated) and desalted crude oil. The crude oil 142 may be labeled as unstabilized crude oil. The desalter 120 discharges the crude oil 142 via a conduit to the stabilizer 104. The stabilizer 104 can be considered a component of the GOSP 100 or a component downstream of the GOSP 100 including located elsewhere.

The stabilizer 104 is a stabilizer tower vessel that is a distillation column having distillation trays and a reboiler heat exchanger. The number of distillation trays (distillation separation stages) may be, for example, at least 12 or 16 or more. The reboiler heat exchanger may be a shell-and-tube heat exchanger or similar heat exchanger, a thermos-siphon reboiler, and the like. The operating temperature profile in the stabilizer 104 distillation column may be, for example, at least 175° F. (or at least 200° F.) at the bottom portion of the distillation column and less than 150° F. (or less than 160° F.) at the top portion of the distillation column. The operating pressure in the distillation column may be, for example, less than 10 psig or less than 5 psig, or in a range of 3 psig to 5 psig. This relatively lower pressure may promote separation of vapor and liquid.

In operation, the stabilizer 104 distillation column separates and removes light ends or light components 144 (volatile components such as C1-C4 hydrocarbons) as gas from the crude oil 142. The light components 144 may discharge as an overhead stream from the stabilizer 104 distillation column. The light components 144 may be sent to a mechanical compressor in a gas compression plant. This removal of the light components 144 reduces vapor pressure of the crude oil to give a desired vapor pressure of the stabilized crude oil 106. The associated specification in the product crude oil 107 may be, for example, Reid vapor pressure (RVP) or true vapor pressure (TVP), or both. The stabilized crude oil 106 is discharged as a bottoms stream from the distillation column.

The adjective "stabilized" may refer to the crude oil having a lower vapor pressure and thus being less volatile to facilitate tank storage and pipeline transport. The stabilization may be, for example, to lower the vapor pressure of the crude oil to at least 13 pounds per square inch (psi) below atmospheric pressure so that vapor will generally not flash under atmospheric conditions. The stabilized crude oil 106 may be the product crude oil 107 when no bypass 102 portion of unstabilized crude oil 142 is introduced into the stabilized crude oil 106.

The stabilizer 104 distillation column may remove hydrogen sulfide (H2S) from the crude oil 142 to sweeten the crude oil. The H2S may discharge in the overhead stream in the light components 144. The term "sweet" crude oil or to "sweeten" crude oil refers to lower H2S content in the crude oil. In the stabilizer 104, the H2S gas dissolved in the crude oil is removed to meet crude-oil specification of H2S content, for example, less than 60 ppm, or in a range of 10 ppm to 70 ppm.

The stabilized crude oil 106 as discharged as the bottom streams from the stabilizer 104 may be sweeten crude oil. The product crude oil 106 may also be dehydrated and desalted. The stabilizer crude oil 106 is pumped by the bottoms pump 146 of the stabilizer 104 distillation column through the heat exchanger 134. The stabilized crude oil 106 (along with any added unstabilized crude oil) may be sent as product crude oil 107 to storage, export, and refining. Specifications for the product crude oil 107 may include, for example: (1) salt concentration less than 10 pounds salt per thousand barrels of crude oil (PTB); (2) basic sediment and water (BS&W) content less than 0.3 volume percent of the crude oil; (3) H2S content less than 70 ppmw; and (4) maximum true vapor pressure (TVP) (per ASTM D 2879) less than 13 pounds per square inch absolute (psia) at storage temperature. The BS&W is generally measured from a liquid sample of the crude oil. The BS&W includes water, sediment, and emulsion. The BS&W is typically measured as a volume percentage of the crude oil.

As indicated, a bypass 102 portion (slip stream) of the unstabilized crude oil 142 discharged from the desalter 120 may be diverted around the stabilizer 104 via a bypass 102 conduit and control valve 110 to the discharge of the bottoms pump 146. The upstream part of the bypass 102 conduit may branch from the conduit conveying the crude oil 142 from the desalter 120 to the stabilizer 104. On the other hand, the bypass conduit may originate directly from desalter 120 vessel, such as from a nozzle on the desalter 120 vessel.

The bypass 102 portion (slip stream) may be added to a conduit conveying the stabilized crude oil 106 from the stabilizer 104. The total product crude oil 107 may be the stabilized crude oil 106 discharged from the stabilizer 104 plus the bypass 102 portion (slip stream) of intermediate crude 142 (unstabilized) discharged from the desalter 120.

The control valve 110 may be a flow control valve disposed along the bypass 102 conduit. The hydraulic pump head of the upstream pump 132 may be sized to provide motive force for flow of the bypass 102 stream into the conduit conveying the product crude oil 106. Moreover, while the bypass 102 flow is shown as entering the conduit conveying product crude oil 106 upstream of the heat exchanger, other implementations may provide for the bypass 102 flow to enter the conduit conveying the stabilized crude oil 106 downstream of the heat exchanger 134. Further, the bypass 102 conduit, control valve 110, and associated RC 108 may be installed in a newly-constructed GOSP or as a retrofit in an existing GOSP.

The desalter vessel 120 may have a nozzle dedicated for discharge of off-spec crude oil during abnormal operation. In one example of a retrofit of an existing GOSP facility, the bypass 102 conduit is coupled to the off-spec nozzle for receipt of the bypass 102 flow during normal operation.

The bypass 102 may provide for increased production rate of product crude oil. For instance, for a 100% production basis of stabilized product crude oil 106 as discharged or limited by the stabilizer 104, the bypass 102 can add unstabilized crude oil 142, for example, at 20% of the production basis in one example with the product crude oil 106 meeting stabilization specification. Thus, production is increased +20% to 120%. In that example, the amount of bypass 102 (slip stream) of unstabilized crude oil 142 (directly from the desalter 120) in the total product crude oil 107 is 16.67%. In other words, the +20% (unstabilized)/120% (stabilized+unstabilized) is equal to 16.67%.

The amount of the bypass 102 flow (e.g., mass per time or volume per time) may be specified, controlled, and limited such that with the introduction of unstabilized and unsweetened crude oil 142, the product crude oil 107 remains within product specification. The set point of the flow control valve 110 may be manually set by a human operator to give a desired amount of crude oil 142 (bypass 102 slip stream) added to the stabilized crude oil 106. The set point of the flow control valve 110 may be set by an RC 108 to give the desired amount of crude oil 142 (bypass 102 slip stream) added to the stabilized crude oil 106. The set point can also be varied based on or in response to online analyzers located in mixed total crude.

The RC 108 may control the amount (e.g., percent) of bypass 102 unstabilized crude oil 142 in the product crude oil 107. The RC 108 may control the ratio of the amount of bypass 102 unstabilized crude oil 142 to the amount of stabilized crude oil 106 discharged from the stabilizer 104. The RC 108 may control the ratio of the amount of bypass 102 flow to the total amount of product crude oil 107 including the bypass 102 flow. The total amount of the product crude oil 107 may be the amount of stabilized crude oil 106 discharged from the stabilizer 104 plus the amount of the bypass 102 flow (crude oil 142) added to the stabilized crude oil 106.

The set point of the RC 108 may be entered by a human operator or can be automatically set in some examples based on feedback from online analysis of the product crude oil 107 sent to storage. The set point of the RC 108 may give the blend or maximum blend of unstabilized crude (bypass 102 flow) with stabilized crude (crude 106 from stabilizer 104).

The set point of the RC 108 may be, for instance, a percent or a fraction. The set point can be the percent of bypass 102 (crude oil 142) in the product crude oil 107. In some implementations, this set point may be limited, for instance, to less than 25% or less than 20%. The percent may be mass percent or volume percent.

The set point of the RC 108 can be the ratio of the amount of the bypass 102 (crude oil 142 slip stream) to the amount of the bottoms stream (stabilizer crude oil 106) discharged from the stabilizer 104. The set point of the RC 108 can be the ratio of the amount of the bypass 102 (crude oil 142 slip stream) to the total amount of product crude oil 107 sent to storage. The RC 108 may be a local controller or associated with a control system 148.

The GOSP 100 may include a control system 148 that facilitates or directs operation of the GOSP 100, such as the supply or discharge of flow streams (including flow rate) and associated control valves, control of operating temperatures and operating pressures, control of heat exchangers, and so on. The control system 148 may include a processor and memory storing code (e.g., logic, instructions, etc.) executed by the processor to perform calculations and direct operations of the GOSP 100. The processor (hardware processor) may be one or more processors and each processor may have one or more cores. The processor(s) may include a microprocessor, central processing unit (CPU), graphic processing unit (GPU), controller card, circuit board, or other circuitry. The memory may include volatile memory (for example, cache or random access memory), nonvolatile memory (for example, hard drive, solid-state drive, or read-only memory), and firmware. The control system 148 may include a desktop computer, laptop computer, computer server, control panels, programmable logic controller (PLC), distributed computing system (DSC), controllers, actuators, or control cards. The control system 148 may be communicatively coupled to a remote computing system that performs calculations and provides direction. The control system 148 may receive user input or remote-computer input that specifies the set points of control devices or other control components in the GOSP 100. In some implementations, the control system 148 may calculate or otherwise determine set points of the control devices. Some implementations may include a control room that can be a center of activity, facilitating monitoring and control of the process or facility. The control room may contain a human machine interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data. The control system may also or instead employ local control panels distributed in the GOSP.

Figure 2:
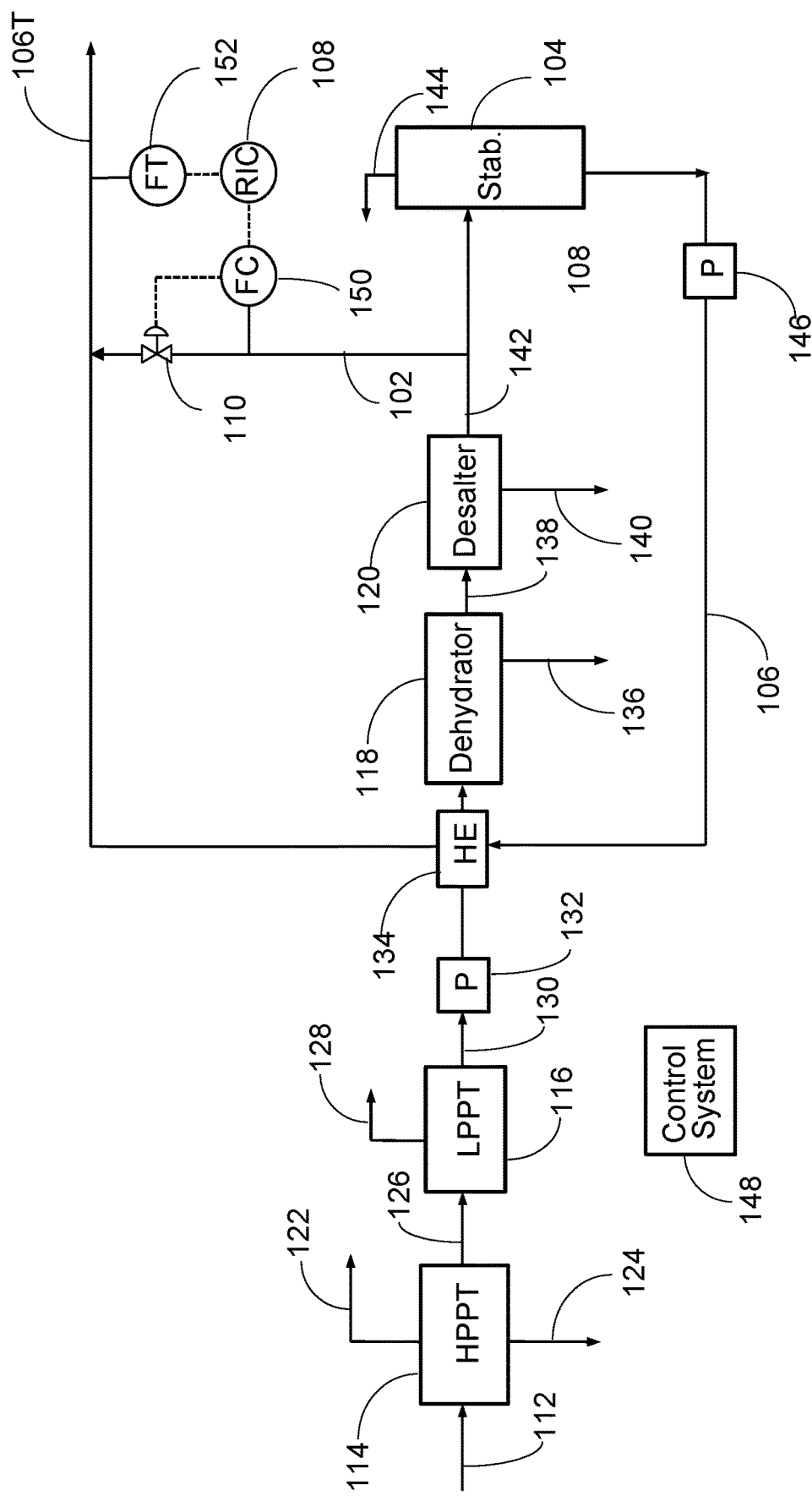

FIG. 2 is a GOSP 200 that may be analogous to the GOSP 100 of FIG. 1. The GOSP 200 includes a flow controller (FC) 150 that drives the flow control valve 110. The FC 150 may be a flow indicator controller (FIC) 150 that indicates flow rate of the bypass 102 flow through the bypass 102 conduit. The FC 150 may receive indication of the flow rate via a flow sensor disposed along the bypass 102 conduit. The flow sensor may be, for example, a differential pressure meter (with a flow orifice), a mass meter, and the like. The FC 150 may receive a set point for the flow control valve 110 and set/adjust the valve opening of the control valve 110 to maintain the flow rate through the control valve 110 at set point. The set point may be entered to the FC 150 manually by a human operator, such as via a local control panel or remotely via the control system 148.

In the illustrated embodiment, the set point of the control valve 110 may be set by the RIC 108. Thus, the RIC 108 may be a master controller and the FC 150 a slave controller in a master/slave relationship. The set point of the control valve 110 may be the slave set point. A master set point (ratio set point) may be entered to the RIC 108. RIC 108 can also directly control FC 150 based on given set point. The ratio may be based on volume or mass. The control circuitry and programming may be local and/or remote in the control system 148.

In operation, the RIC 108 may receive indication of the flow rate of total product crude 107 (stabilized and unstabilized) from a flow sensor via a flow transmitter (FT) 152, as depicted in FIG. 2. As mentioned, the product crude oil 107 may be pumped to storage for export, distribution, and processing (e.g., in a petroleum refinery). The flow sensor (e.g., differential pressure meter or mass meter) may be disposed along the conduit conveying the product crude 107 to storage. Based on the indication of the amount of this product crude 107 flow rate received via FT 152, the RIC 108 to maintain a ratio (e.g., a percent or dimensionless value) may specify the set point (e.g., mass per time or volume per time) to the FC 150 for the control valve 110. The ratio may be the ratio of the bypass 102 flow rate (unstabilized crude) to the crude oil 106 flow rate (stabilized crude) discharged from the stabilizer 104. The ratio may be the ratio of the bypass 102 flow rate (unstabilized crude) to the total product crude oil 107 rate (unstabilized and stabilized crude). In either case, the value of the ratio may be entered as a ratio set point of the RIC 108 (a master set point), for example, by a human operator via a local control panel or remotely via the control system 148. As indicated, the ratio set point may be, for instance, in percent or as a dimensionless fraction. In some examples, the ratio set point is entered as less than 25% or less than 20%. The ratio may represent the blend of unstabilized crude that can be mixed with stabilized crude while maintaining the product crude oil 107 within a stabilization specification (e.g., RVP or TVP in psia), or a sweeting specification (e.g., H2S content in ppm).

Figure 3:
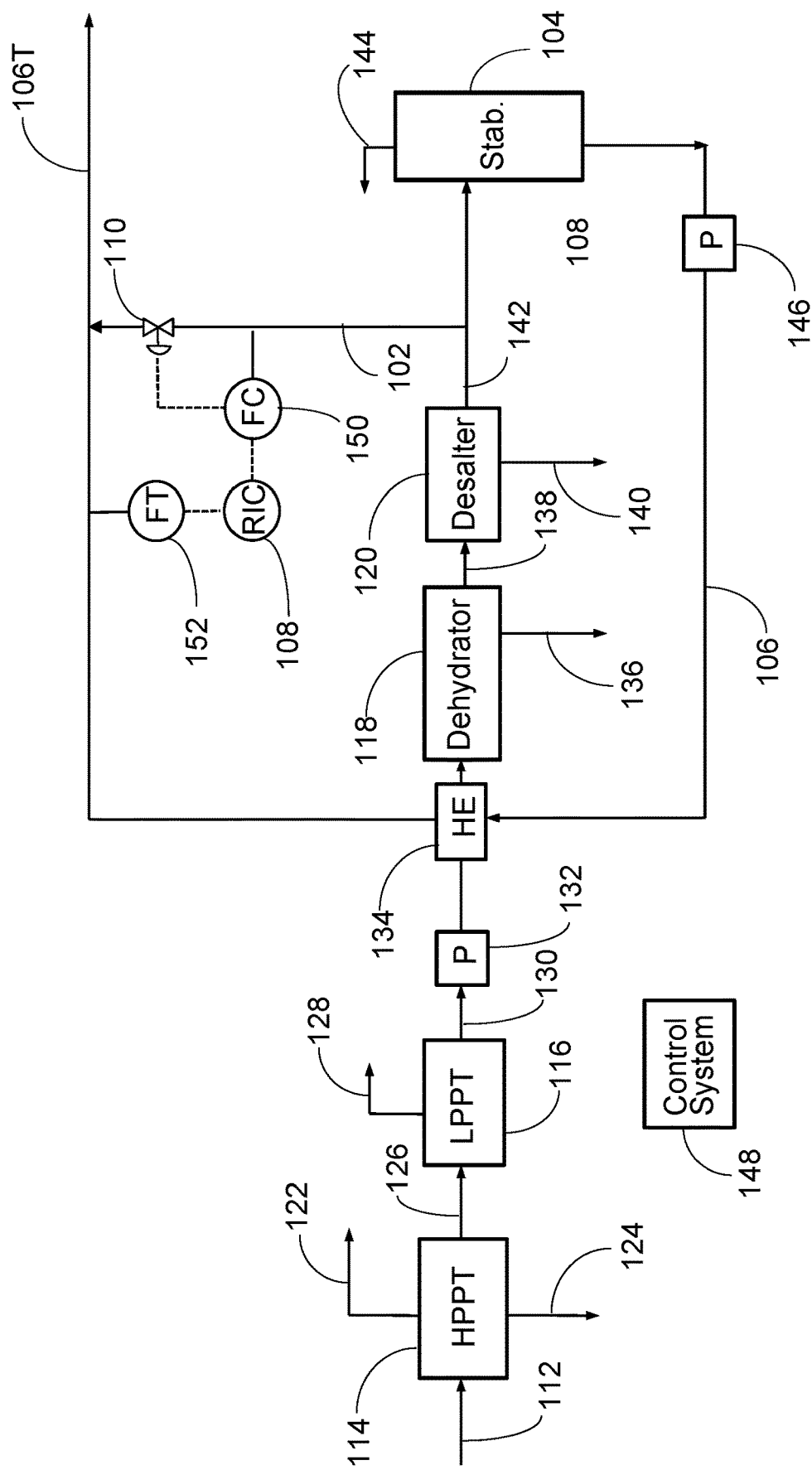

FIG. 3 is a GOSP 200 that may be analogous to the GOSP 100 of FIG. 1 and GOSP 200 of FIG. 2. The difference between GOSP 300 (FIG. 3) and GOSP 200 (FIG. 2) is the FT 152 provides indication to the RIC 108 of the flow rate of the stabilized crude oil 106 discharged from the stabilization column 104. Based on the indicated amount of this stabilized crude 106 flow, the RIC 108 may specify set point to the FC 150 for the control valve 110 to give a bypass 102 flow rate to maintain one of the ratios discussed with respect to FIG. 2. The ratio may be volume percent or mass percent. It should be noted that the RIC 108 can receive indication via flow sensors and flow transmitters of both the stabilized crude oil 106 flow rate and the product crude oil 107 flow rate, and perform calculations accordingly to specify the slave set point to the FC 150.

Figure 4:
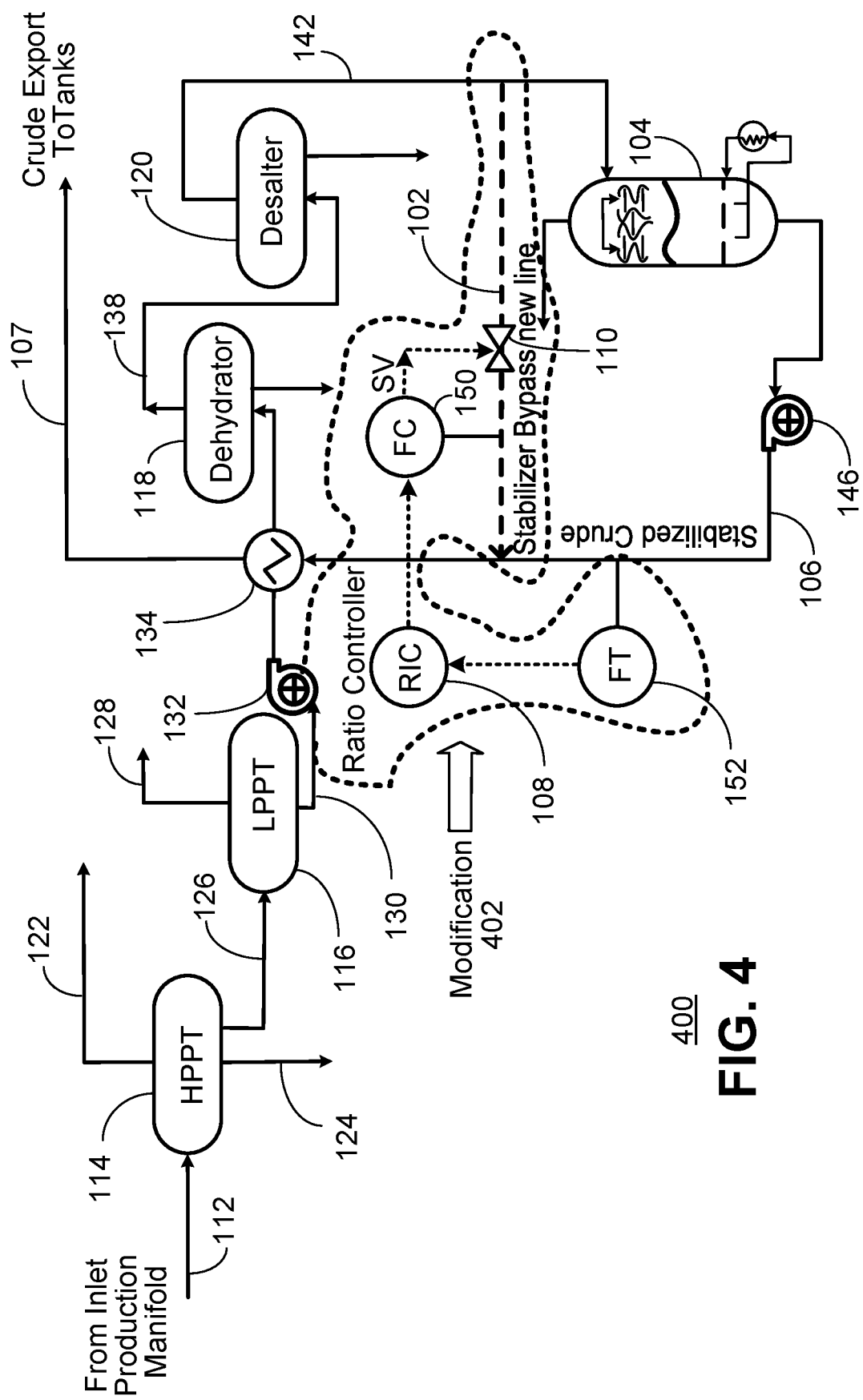

FIG. 4 is a GOSP 400 that may be analogous to the GOSP 100, 200, 300 of previous figures. The bypass 102 conduit and associated controls are depicted as a modification 402 (retrofit) of a GOSP facility. In the illustrated embodiment, the RIC 108 receives indication from FT 152 of the flow rate of stabilized crude 106 from the stabilizer 104. Based on this indicated amount of stabilized crude 106 flow, the RIC 108 may specify the set point to the FC 150 for the control valve 110 to give a bypass 102 flow rate to maintain the mass or volume ratio of the amount (flow rate) of the stabilized crude oil 106 (discharged from the stabilizer 104) to the amount (flow rate) of the unstabilized crude oil through the bypass line 102 from the desalter 120. The RIC 108 may maintain the ratio per a ratio set point entered to the RIC 108. The value of the ratio set point entered may be such that the product crude oil 107 remains within specification. In certain embodiments this ratio set point (master set point) is specified at less than 20%.

Figure 5:
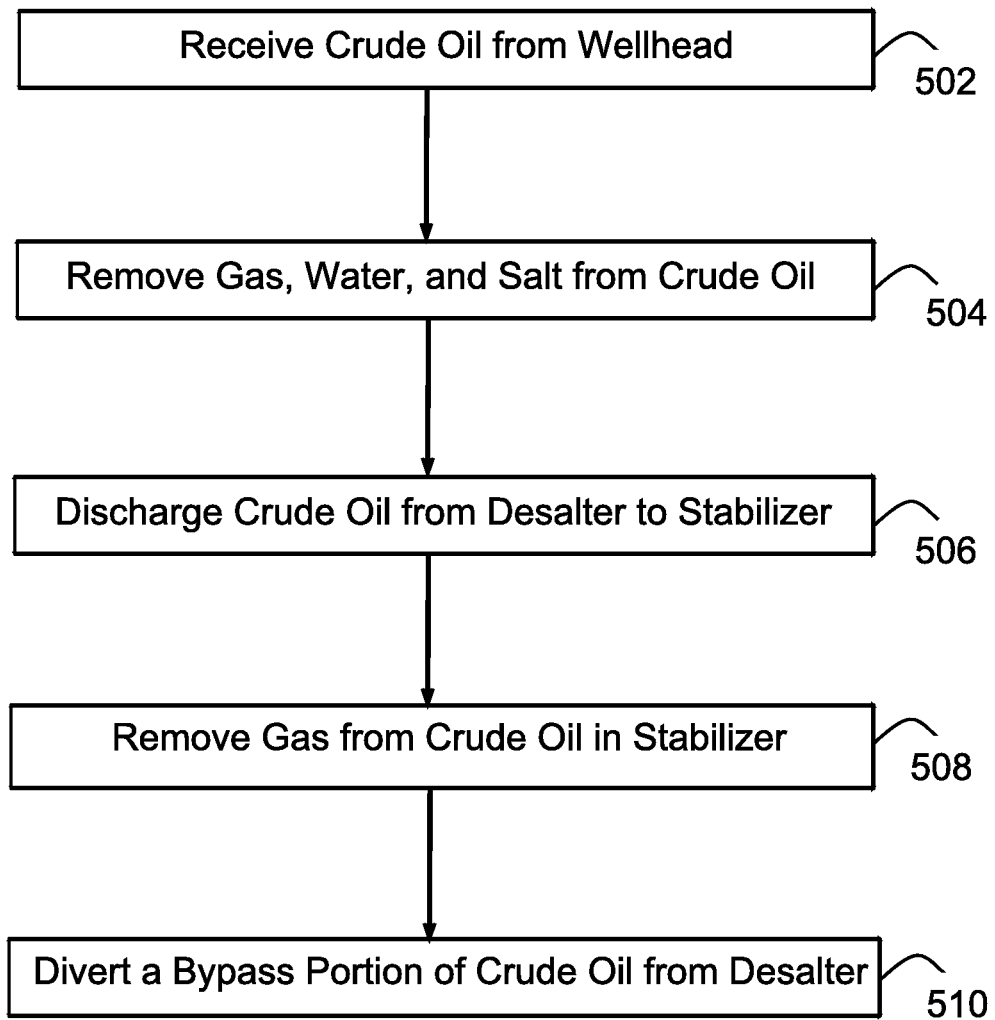
FIG. 5 is a block flow diagram of a method of operating a GOSP.

FIG. 5 is a method 500 of operating a GOSP. At block 502, the method includes receiving crude oil from a wellhead. At block 504, the method includes removing gas, water, and salt from the crude oil via a GOSP train. The GOSP train includes a first production trap (e.g., HPPT vessel), a second production trap (e.g., LPPT vessel), a dehydrator vessel, and a desalter vessel. The first production trap may the crude oil from the wellhead and discharge crude oil to the second production trap. The second production trap may discharge crude oil to the dehydrator vessel. The dehydrator vessel may discharge crude oil to the desalter vessel.

At block 506, the method includes discharging the crude oil from the desalter vessel as unstabilized crude oil (intermediate crude) to a stabilizer distillation column. The unstabilized crude discharged from the desalter may be dehydrated and desalted crude oil. The unstabilized crude may be de-gassed.

At block 508, the method includes removing gas from the unstabilized crude oil via the stabilizer distillation column to reduce vapor pressure of the unstabilized crude oil to give stabilized crude oil, and discharging the stabilized crude oil from the stabilizer distillation column. The method may include removing H2S from the crude oil via the stabilization distillation column to sweeten the crude oil.

At block 510, the method operationally in parallel with blocks 506 and 508 includes diverting or routing a bypass portion of the unstabilized crude oil discharged from the desalter vessel to the stabilized crude oil operationally downstream of the stabilizer distillation column to give product crude oil. Such may increase production of the product crude oil. The bypass portion of unstabilized crude may be added to a conduit conveying the stabilized crude oil discharged from the stabilizer distillation column. The product crude oil includes the stabilized crude oil discharged from the distillation column and the bypass portion of the unstabilized crude oil. The method may include specifying an amount of the bypass portion of the unstabilized crude in the product crude oil. The bypass portion may be specified, for example, at less than 25% (or less than 20%) of the product crude oil. The method may include specifying an amount of the bypass portion in response to (or to satisfy) a specification (e.g., TVP, RVP, or H2S content, or any combinations thereof) of the product crude oil.

The method may include specifying a ratio of the amount of the bypass portion of the unstabilized crude oil to an amount of the stabilized crude oil discharged from the stabilization distillation column. The method may include specifying a set point of a ratio controller that adjusts the amount of the bypass portion of the unstabilized (intermediate) crude oil to maintain the ratio of the amount of the bypass portion of the unstabilized crude to an amount of the stabilized crude oil discharged from the stabilizer distillation column. The method may include specifying a ratio of the amount of the bypass portion to the amount of the product crude oil. The method may include specifying a set point of a ratio controller that adjusts the amount of the bypass portion of the unstabilized (intermediate) crude oil to maintain the ratio of the amount of the bypass portion of the unstabilized crude to the amount of the product crude oil.

An embodiment is a GOSP including a first production trap (e.g., HPPT vessel) to receive crude oil from a wellhead and remove gas and water from the crude oil. The GOSP includes a second production trap (e.g., LPPT vessel) to receive the crude oil from the first production trap and remove gas from the crude oil. The GOSP includes a dehydrator vessel to receive the crude oil from the second production trap and remove water from the crude oil. Further, the GOSP includes a desalter vessel to receive the crude oil from the dehydrator vessel and remove salt from the crude oil via water discharged from the desalter vessel. The GOSP also includes (or discharges to) a stabilizer distillation column that receives the crude oil from the desalter vessel and removes gas from the crude oil to reduce vapor pressure of the crude oil. The stabilizer distillation column may remove H2S from the crude oil to sweeten the crude oil.

The GOSP includes a bypass conduit to route a bypass portion of the crude oil from the desalter vessel to a conduit conveying crude oil discharged from the stabilization distillation column. The combination of the bypass portion of the crude oil (e.g., unstabilized crude oil) from the desalter vessel plus the crude oil (e.g., stabilized crude oil) discharged from the stabilization column may give a product crude oil. The product crude oil may be sent, for example, to storage for export or a refinery. A flow control valve may be disposed along the bypass conduit to control flow rate of the bypass portion of the crude oil (e.g., unstabilized crude oil) from the desalter vessel. The GOSP may include a controller to specify a set point of the flow control valve to give percent content (e.g., 25% or less, 20% or less, etc.) in product crude oil of the bypass portion. A ratio controller to specify a set point of the flow control valve. Again, the product crude oil may include the crude oil discharged from the stabilizer distillation column plus the bypass portion.

A number of implementations have been described. Nevertheless, it will be understood that various modifications may be made without departing from the spirit and scope of the disclosure.

What is claimed is:

1. A method of operating a gas oil separation plant (GOSP), the method comprising:
   receiving crude oil from a wellhead;
   removing gas, water, and salt from the crude oil via a GOSP train comprising a first production trap, a second production trap, a dehydrator vessel, and a desalter vessel;
   discharging the crude oil from the desalter vessel as unstabilized crude oil to a stabilizer distillation column;
   removing gas from the unstabilized crude oil via the stabilizer distillation column to reduce vapor pressure of the unstabilized crude oil;
   discharging stabilized crude oil from the stabilizer distillation column; and
   diverting a bypass portion of the unstabilized crude oil discharged from the desalter vessel to the stabilized crude oil downstream of the stabilizer distillation column to give a product crude oil, wherein the product crude oil comprises the stabilized crude oil discharged from the distillation column and the bypass portion of the unstabilized crude oil.

2. The method of claim 1, comprising specifying an amount of the bypass portion of the unstabilized crude in the product crude oil, wherein the amount comprises less than 25% of the product crude oil, and wherein diverting the bypass portion gives the amount of the bypass portion in the product crude oil as specified.

3. The method of claim 1, comprising specifying an amount of the bypass portion in response to a specification of the product crude oil, wherein diverting the bypass portion comprises diverting the amount of the bypass portion as specified.

4. The method of claim 3, wherein the specification comprises true vapor pressure (TVP), Reid vapor pressure (RVP), or H2S content, or any combinations thereof.

5. The method of claim 1, comprising specifying a ratio of an amount of the bypass portion of the unstabilized crude oil to an amount of the stabilized crude oil discharged from the stabilization distillation column, wherein diverting the bypass portion gives the ratio as specified.

6. The method of claim 1, comprising increasing production rate of the product crude oil via the diverting of the bypass portion of the unstabilized crude oil to the stabilized crude oil downstream of the stabilizer distillation column, and wherein diverting the bypass portion comprises adding the bypass portion of the unstabilized crude oil to a conduit conveying the stabilized crude oil discharged from the stabilizer distillation column.

7. The method of claim 1, comprising specifying a ratio of an amount of the bypass portion to an amount of the product crude oil, wherein diverting the bypass portion gives the ratio as specified.

8. The method of claim 1, wherein the unstabilized crude oil discharged from the desalter vessel comprises dehydrated and desalted crude oil.

9. The method of claim 1, wherein removing gas from the unstabilized crude oil comprises removing hydrogen sulfide (H2S) from the unstabilized crude oil via the stabilization distillation column to sweeten the unstabilized crude oil.

10. The method of claim 1, wherein the first production trap receives the crude oil from the wellhead and discharges crude oil to the second production trap, wherein the second production trap discharges crude oil to the dehydrator vessel, and wherein the dehydrator vessel discharges crude oil to the desalter vessel.

11. A method of operating a gas oil separation plant (GOSP), the method comprising:
    removing gas, water, and salt from feed crude oil received from a wellhead to give an intermediate crude oil comprising de-gassed, dehydrated, and desalted crude oil;
    discharging the intermediate crude oil from a desalter vessel to a stabilizer distillation column;
    removing gas from the intermediate crude oil via the stabilizer distillation column to reduce vapor pressure of the intermediate crude oil to give stabilized crude oil;
    discharging the stabilized crude oil from the stabilizer distillation column; and
    bypassing a portion of the intermediate crude oil from the desalter vessel around the stabilizer distillation column to the stabilized crude oil operationally downstream of the stabilizer distillation column to give a product crude oil, wherein the product crude oil comprises the stabilized crude oil discharged from the stabilizer distillation column plus the portion of the intermediate crude oil from the desalter vessel that bypasses the distillation column.

12. The method of claim 11, wherein removing gas from the intermediate crude oil comprises removing hydrogen sulfide (H2S) from the intermediate crude oil via the stabilizer distillation column to give the stabilized crude oil discharged from the stabilizer distillation as sweeten stabilized crude oil.

13. The method of claim 11, comprising specifying an amount of the portion of the intermediate crude oil that bypasses the stabilizer distillation column to satisfy a product specification of the product crude oil, wherein the product specification comprises true vapor pressure (TVP), Reid vapor pressure (RVP), or H2S content, or any combinations thereof, and wherein the portion of the intermediate crude oil that bypasses the stabilizer distillation column comprises the amount specified.

14. The method of claim 11, comprising:
specifying a set point of a ratio controller that adjusts an amount of the portion of the intermediate crude oil to maintain a ratio of the amount of the portion of the intermediate crude to an amount of the stabilized crude oil discharged from the stabilizer distillation column;
entering the set point as specified to the ratio controller; and
maintaining, via the ratio controller, the ratio at the set point as entered.

15. The method of claim 11, comprising specifying a set point of a ratio controller that adjusts an amount of the portion of the intermediate crude oil to maintain a ratio of the amount of the portion of the intermediate crude to an amount of the product crude oil, wherein specifying the set point comprises entering the set point to the ratio controller, and wherein the ratio controller maintains the ratio at the set point.

16. The method of claim 11, wherein bypassing the portion of the intermediate crude oil from the desalter vessel around the stabilizer distillation column increases production of the product crude oil.

17. A gas oil separation plant (GOSP) comprising:
a first production trap to receive crude oil from a wellhead and remove gas and water from the crude oil;
a second production trap to receive the crude oil from the first production trap and remove gas from the crude oil;
a dehydrator vessel to receive the crude oil from the second production trap and remove water from the crude oil;
a desalter vessel to receive the crude oil from the dehydrator vessel and remove salt from the crude oil via water discharged from the desalter vessel;
a stabilizer distillation column to receive the crude oil from the desalter vessel and remove gas from the crude oil to reduce vapor pressure of the crude oil; and
a bypass conduit to route a bypass portion of the crude oil from the desalter vessel to a conduit conveying crude oil discharged from the stabilization distillation column.

18. The GOSP of claim 17, comprising a flow control valve disposed along the bypass conduit to control flow rate of the bypass portion.

19. The GOSP of claim 18, comprising a controller to specify a set point of the flow control valve to give percent content in product crude oil of the bypass portion, the product crude oil comprising the crude oil discharged from the stabilizer distillation column plus the bypass portion.

20. The GOSP of claim 19, wherein the bypass portion is unstabilized crude oil, and wherein the percent content is less than 25%.

21. The GOSP of claim 18, comprising a ratio controller to specify a set point of the flow control valve.

22. The GOSP of claim 17, wherein the stabilizer distillation column removes a hydrogen sulfide (H2S) gas from the crude oil to produce sweeten crude oil.

* * * * *